United States Patent
Winterstein et al.

(10) Patent No.: US 9,282,285 B2
(45) Date of Patent: Mar. 8, 2016

(54) PROVIDING USER VIDEO HAVING A VIRTUAL CURTAIN TO AN ONLINE CONFERENCE

(71) Applicant: Citrix Systems, Inc., Fort Lauderdale, FL (US)

(72) Inventors: Florian Winterstein, Rolling Hills Est., CA (US); Albert Alexandrov, Goleta, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 276 days.

(21) Appl. No.: 13/913,748

(22) Filed: Jun. 10, 2013

(65) Prior Publication Data

US 2014/0362163 A1    Dec. 11, 2014

(51) Int. Cl.
*H04N 7/14*     (2006.01)
*H04N 7/15*     (2006.01)
*G06T 5/00*     (2006.01)

(52) U.S. Cl.
CPC *H04N 7/15* (2013.01); *G06T 5/002* (2013.01); *H04N 7/141* (2013.01)

(58) Field of Classification Search
CPC .......... H04N 7/15; H04N 7/152; H04N 7/147
USPC .......... 348/14.01, 14.02, 14.07, 14.08, 14.09, 348/14.15; 379/88.13, 93.21, 158, 202.01, 379/205.01
See application file for complete search history.

(56) References Cited

U.S. PATENT DOCUMENTS

| | | | |
|---|---|---|---|
| 7,680,885 B2 | 3/2010 | Schauser et al. | |
| 7,827,139 B2 | 11/2010 | Schauser et al. | |
| 7,978,617 B2 | 7/2011 | von Eicken et al. | |
| 8,140,618 B2 | 3/2012 | Alexandrov et al. | |
| 8,223,943 B2 | 7/2012 | Alexandrov et al. | |
| 8,296,364 B2 | 10/2012 | Alexandrov et al. | |
| 8,325,896 B2 | 12/2012 | Alexandrov et al. | |
| 8,375,087 B2 | 2/2013 | Schauser et al. | |
| 8,443,040 B2 | 5/2013 | Schauser et al. | |
| 8,477,651 B2 | 7/2013 | von Eicken et al. | |
| 8,520,821 B2 | 8/2013 | Alexandrov et al. | |
| 8,694,137 B2 | 4/2014 | Winterstein et al. | |
| 8,732,242 B2 | 5/2014 | Alexandrov et al. | |
| 8,761,349 B2 | 6/2014 | Winterstein | |
| 2005/0232168 A1 | 10/2005 | Schauser et al. | |
| 2005/0235014 A1 | 10/2005 | Schauser et al. | |
| 2006/0002315 A1 | 1/2006 | Theurer et al. | |

(Continued)

FOREIGN PATENT DOCUMENTS

WO     2010036098 A1     4/2010

*Primary Examiner* — Yosef K Laekemariam
(74) *Attorney, Agent, or Firm* — BainwoodHuang

(57) ABSTRACT

A technique provides user video to an online conference. The technique involves receiving a live user video signal from a camera device. The live user video signal defines a field of view. The technique further involves automatically identifying live initial content of a presentation region within the field of view and live initial content of a privacy region (e.g., a background region) within the field of view. The technique further involves generating, as the user video signal to the online conference, a modified user video signal based on the live user video signal. The modified video signal includes (i) the live initial content of the presentation region within the field of view and (ii) modified video content in place of the live initial content of the privacy region within the field of view. Such operation effectively forms a virtual curtain in which anything in the background is hidden.

23 Claims, 6 Drawing Sheets

(56) References Cited

U.S. PATENT DOCUMENTS

| | | |
|---|---|---|
| 2006/0026628 A1* | 2/2006 | Wan et al. .................. 725/32 |
| 2006/0031779 A1 | 2/2006 | Theurer et al. |
| 2007/0011356 A1 | 1/2007 | Schauser et al. |
| 2008/0069005 A1 | 3/2008 | von Eicken et al. |
| 2008/0259154 A1* | 10/2008 | Garrison et al. ........... 348/14.01 |
| 2012/0143955 A1 | 6/2012 | Alexandrov et al. |
| 2012/0179811 A1 | 7/2012 | Eicken et al. |
| 2013/0024518 A1 | 1/2013 | Alexandrov et al. |
| 2013/0111362 A1 | 5/2013 | Alexandrov et al. |

* cited by examiner

PROVIDING USER VIDEO HAVING A VIRTUAL CURTAIN TO AN ONLINE CONFERENCE

BACKGROUND

In general, a video conference (or web meeting) involves communications between multiple client devices (e.g., computers, tablets, smart phones, etc.) and a meeting server. Typically, each client device sends audio and video input (e.g., captured via a microphone and a webcam) to the meeting server, and receives audio and video output (e.g., presented via speakers and a display) from the meeting server.

Accordingly, the participants of the video conference are able to share both voice and video data for effective communications, i.e., the participants are able to view each other, ask questions, inject comments, etc. in the form of a collaborate exchange even though they may be distributed among different remote locations. GoToMeeting is an example of a web-hosted service which is capable of operating in a similar manner, and which is offered by Citrix Systems, Inc. of Fort Lauderdale, Fla.

SUMMARY

Unfortunately, there are deficiencies to a conventional video conference which simply shares video data among participants. In particular, some participants may elect to turn off their video cameras to prevent simple sharing of their video data during video conferences. For example, if a participant has a messy office, that participant may be embarrassed by its appearance and thus disconnect the webcam during video conferences. As another example, if a participant connects from home, that participant may not want other meeting participants to view items or other people in the participant's home and thus turn off the camera during video conferences. Other social and/or privacy concerns may exist as well thus prompting participants to deactivate their video cameras during video conferences. Regrettably, with video cameras turned off, the overall experience during video conferences may be substantially diminished.

In contrast to the above-described conventional video conference which simply shares video data among participants, improved techniques are directed to providing user video having a virtual curtain to an online conference. With such techniques, live initial content of a background region within a field of view can be replaced with modified video content (e.g., blurred content) to hide anything in the background region. For example, depth sensing technology is capable of identifying background regions which can then be blurred (or otherwise replaced) and thus removed from view. Accordingly, participants are able to engage in online conferences in any locations without having to be concerned with what is shared in the background.

One embodiment is directed to a method of providing user video to an online conference. The method includes receiving a live user video signal from a camera device. The live user video signal defines a field of view. The method further includes automatically identifying live initial content of a presentation region within the field of view and live initial content of a privacy region within the field of view. The method further includes generating, as the user video to the online conference, a modified user video signal based on the live user video signal. The modified video signal includes (i) the live initial content of the presentation region within the field of view and (ii) modified video content in place of the live initial content of the privacy region within the field of view. Such replacement of the live initial content of the privacy region with modified video content effectively forms a virtual curtain, i.e., a field of view in which anything in the background is hidden.

In some arrangements, automatically identifying the live initial content of the presentation region and the live initial content of the privacy region includes isolating the live initial content of the privacy region from the live initial content of the presentation region based on depth measurement data. For example, the live user video signal may include a series of video frames, each video frame including an array of pixels, each pixel having an original pixel value and a depth value, the depth values of the pixels forming at least some of the depth measurement data. In these arrangements, isolating the live initial content of the privacy region from the live initial content of the presentation region based on the depth measurement data includes, for each pixel, (i) maintaining the original pixel value when the depth value of that pixel is below a predefined depth threshold and (ii) replacing the original pixel value with a different pixel value when the depth value of that pixel exceeds the predefined depth threshold.

In some arrangements, replacing the original pixel value with the different pixel value when the depth value of that pixel exceeds the predefined depth threshold includes modifying the original pixel value based on a blurring algorithm to blur the live initial content of the privacy region. Along these lines, modifying the original pixel value based on the blurring algorithm may includes varying a blur effect of the blurring algorithm to (i) mildly blur the live initial content of the privacy region which is closest to the presentation region, and (ii) substantially blur the live initial content of the privacy region which is farthest from the presentation region. Such a display may be visually pleasing to all conference participants while nevertheless effectively providing a virtual curtain to hide background content.

In some arrangements, a participant is able to provide blur control commands to selectively disable and enable use of the blurring algorithm during the online conference. In some arrangements, a participant is able to provide blur variation commands which incrementally vary the amount of blurring performed via the blurring algorithm during the online conference.

In some arrangements, the camera device includes a camera and a depth sensor. In these arrangements, receiving the live user video signal from the camera device includes acquiring, as the live user video signal, a series of video frames including captured images of a user from the camera and depth measurement data from the depth sensor.

In some arrangements, the depth sensor is an infrared laser sensor. In these arrangements, the depth measurement data includes infrared laser measurements of distances between the infrared laser sensor and an environment of the user. Kinect by Microsoft Corporation of Redmond, Wash. is an example of a suitable camera device which performs depth sensing using infrared laser technology. Similar depth sensing camera technologies which are suitable for use are available from Intel Corporation of Santa Clara, Calif. and Creative Technology Ltd. of Jurong East, Singapore, among others.

In some arrangements, the camera is a stereo camera. In these arrangements, the depth measurement data includes depth estimate values of distances between the stereo camera and an environment of the user.

In some arrangements, the camera is a webcam coupled to a user computer. Additionally, the method further includes rendering, by a display of the user computer, an online conference video of the online conference to enable a user of the user computer to view the online conference. Furthermore, generating the modified video signal may include outputting, by the user computer, the modified video signal to an external online conference server through a computer network, the external online conference server being constructed and arranged to manage the online conference.

Other embodiments are directed to electronic systems and apparatus, processing circuits, computer program products, and so on. Some embodiments are directed to various methods, electronic components and circuitry which are involved in providing user video to an online conference.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to providing user video having a virtual curtain to an online conference. With such a technique, live initial content of a privacy region within a field of view can be replaced with modified video content (e.g., blurred content) to hide anything in the privacy region. For example, depth sensing technology is capable of identifying background regions which can then be blurred (or otherwise replaced) and thus removed from view. As a result, participants are able to engage in online conferences in any locations without having to be concerned with what is shared in the background.

Figure 1:
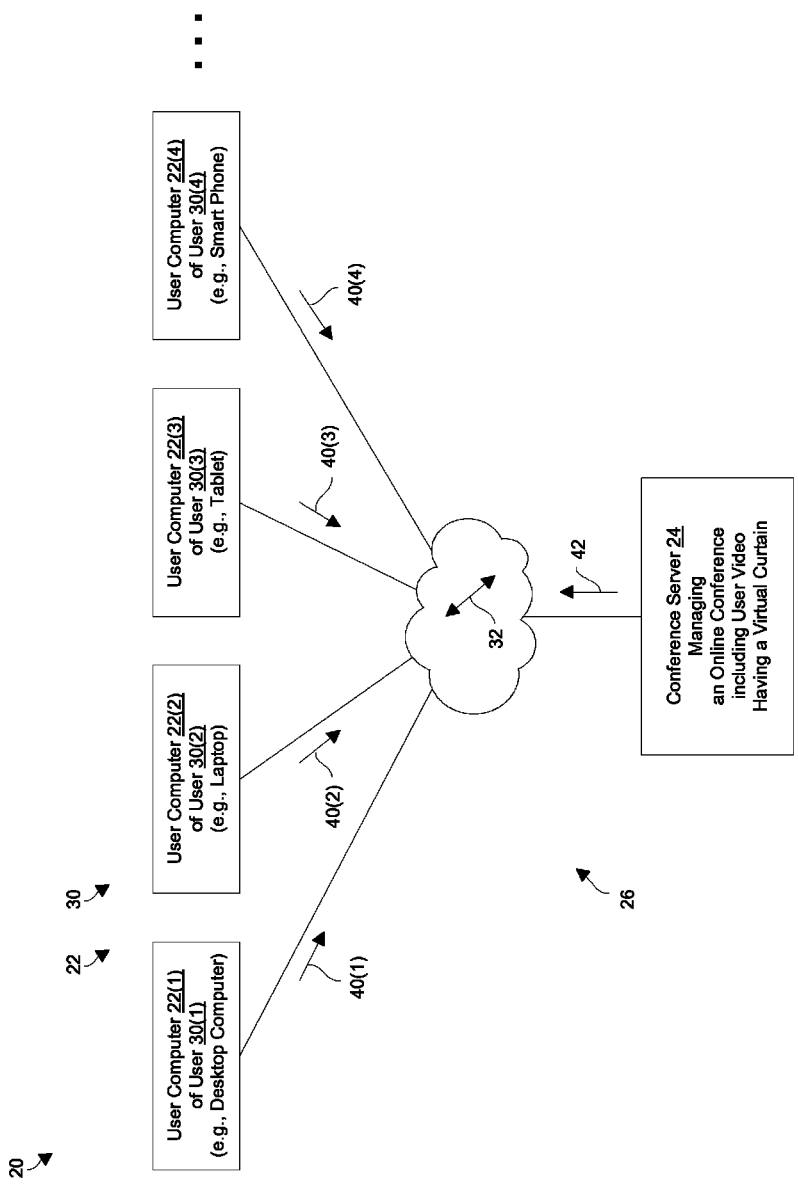
FIG. 1 is a block diagram of an electronic environment in which an online conference handles user video having a virtual curtain.

FIG. 1 shows an electronic environment 20 in which an online conference handles user video having a virtual curtain. The electronic environment 20 includes user computers 22(1), 22(2), 22(3), 22(4), . . . (collectively, user computers 22), a conference server 24, and a communications medium 26.

Each user computer (or general purpose computing apparatus) 22 is constructed and arranged to perform useful work on behalf of respective user 30. Along these lines, each user computer 22 enables its respective user 30 to participate in an online meeting, i.e., a video or web conference. By way of example only, the user computer 22(1) is a desktop workstation operated by a user 30(1). Additionally, the user computer 22(2) is a laptop computer operated by a user 30(2), the user computer 22(3) is a tablet device operated by a user 30(3), the user computer 22(4) is a smart phone operated by a user 30(4), and so on.

The conference server 24 is constructed and arranged to manage online meetings among the users 30. During such conferences, the users 30 are able to share audio data (e.g., provide a presentation, ask questions, inject comments, etc.) and video data (e.g., present slides, view each other, etc.).

The communications medium 26 is constructed and arranged to connect the various components of the electronic environment 20 together to enable these components to exchange electronic signals 32 (e.g., see the double arrow 32). At least a portion of the communications medium 32 is illustrated as a cloud to indicate that the communications medium 32 is capable of having a variety of different topologies including backbone, hub-and-spoke, loop, irregular, combinations thereof, and so on. Along these lines, the communications medium 32 may include copper-based data communications devices and cabling, fiber optic devices and cabling, wireless devices, combinations thereof, and so on. Furthermore, some portions of the communications medium 32 may be publicly accessible (e.g., the Internet), while other portions of the communications medium 32 are restricted (e.g., a private LAN, etc.).

During operation, each user computer 22 provides a respective set of participant signals 40(1), 40(2), 40(3), 40(4) (collectively, participant signals 40) to the conference server 24. Each set of participant signals 40 may include a video signal representing live participant video (e.g., a feed from a webcam, a presenter's desktop or slideshow, etc.), an audio signal representing live participant audio (e.g., an audio feed from a participant headset, an audio feed from a participant's phone, etc.), and additional signals (e.g., connection and setup information, a participant profile, client device information, status and support data, etc.).

Upon receipt of the sets of participant signals 40 from the user computers 22, the conference server 24 processes the sets of participant signals 40 and returns a set of server signals 42 to the user computers 22. In particular, the set of server signals 42 may include a video signal representing the conference video (e.g., combined feeds from multiple webcams, a presenter's desktop or slideshow, etc.), an audio signal representing the conference audio (e.g., an aggregate audio signal which includes audio signals from one or more of the participants mixed together, etc.), and additional signals (e.g., connection and setup commands and information, conference information, status and support data, etc.).

As will be discussed in further detail shortly, during an online meeting the quality of the experience of the users 30 is improved since one or more of the user video signals provided by the users 30 includes a virtual curtain which hides content of a privacy region (see the participant signals 40 in FIG. 1). Such a virtual curtain is capable of hiding a messy office or cluttered room in the background. Accordingly, the availability of a virtual curtain makes it more likely that each user 30 will provide user video while participating in the online meeting, i.e., the camera of each user 30 will be turned on and enabled.

Additionally, the removal of the background enables all participants to focus on the online meeting itself without distraction. In particular, there are no scenes or movement/activity in the background of each user 30 that could otherwise distract the attendees from the online meeting. Further details will now be provided with reference to FIG. 2.

Figure 2:
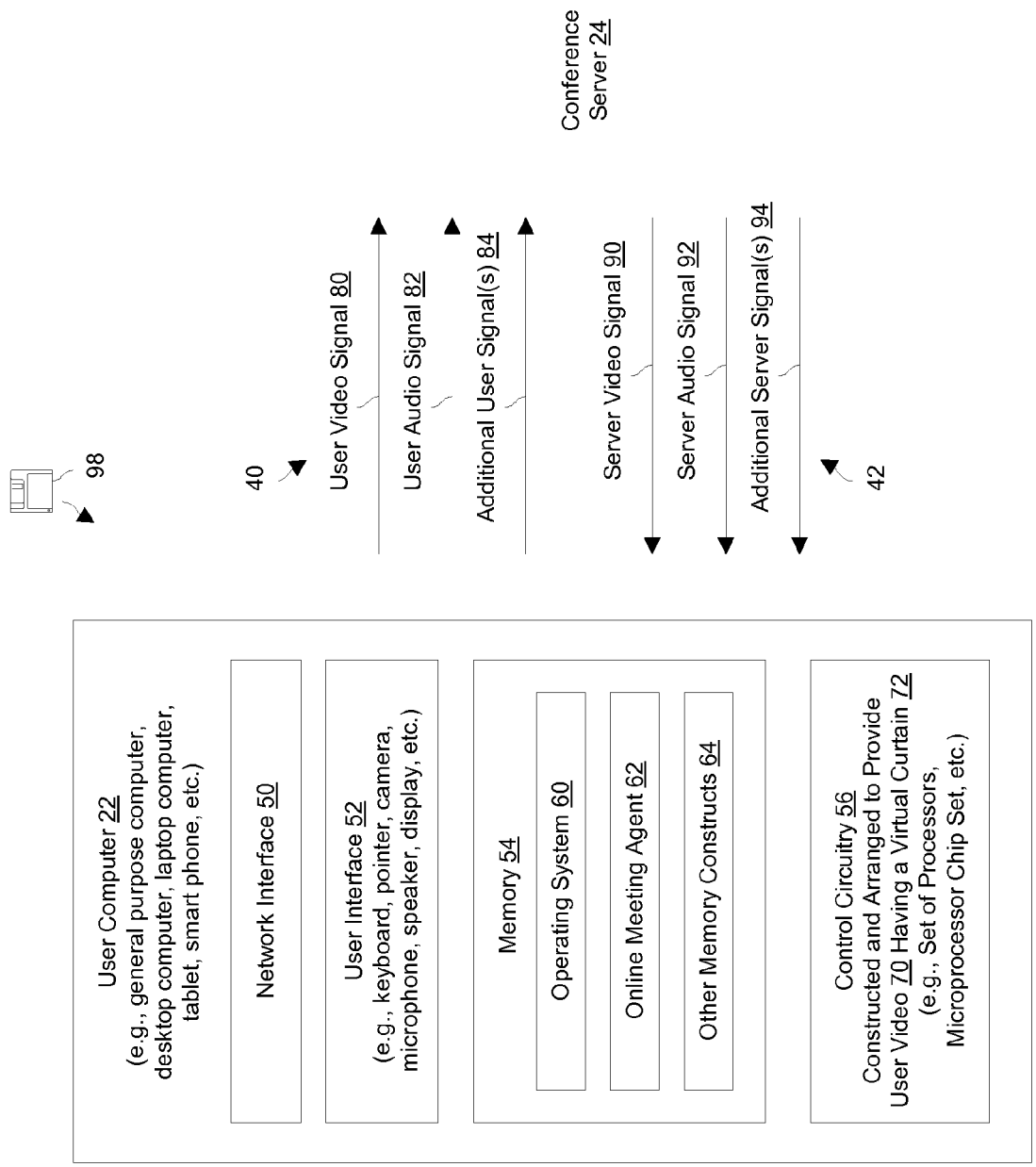
FIG. 2 is a block diagram of a user computer of the electronic environment of FIG. 1.

FIG. 2 shows particular details of a user computer (or similar smart apparatus) 22 which is suitable for use in the electronic environment 20 of FIG. 1. The user computer 22 includes a network interface 50, a user interface 52, memory 54, and a control circuit 56.

The network interface 50 is constructed and arranged to connect the user computer 22 to the communications medium 26 (FIG. 1) for copper-based and/or wireless communications (i.e., IP-based, cellular, etc.). Examples of suitable circuits for the network interface 50 include a network interface card (NIC) and a wireless transceiver. Other networking technologies are available as well (e.g., fiber optic, telephone-based communications, combinations thereof, etc.).

The user interface 52 is constructed and arranged to receive input from a user and provide output to the user. Suitable user input devices include a keyboard, a pointer (e.g., a mouse, a trackball, a touch pad or screen, etc.), a camera, a microphone, and so on. Suitable user output devices include speakers, an electronic display (e.g., a monitor, a touch screen, etc.), and so on. In some arrangements, the user interface include specialized hardware (e.g., a user headset, a hands free peripheral, a specialized camera, etc.).

The memory 54 stores a variety of memory constructs including an operating system 60, an online meeting agent 62, and other constructs and data 64 (e.g., user applications, a user profile, status and support data, etc.). Although the memory 54 is illustrated as a single block in FIG. 2, the memory 54 is intended to represent both volatile and non-volatile storage.

The control circuitry 56 is configured to run in accordance with instructions of the various memory constructs stored in the memory 54. Such operation enables the user computer 22 to perform useful work on behalf of a user 30. In particular, the control circuitry 56 runs the operating system 60 to manage client resources (e.g., processing time, memory allocation, etc.). Additionally, the control circuitry 56 runs the online meeting agent 62 to participate in online meetings. In particular, the control circuitry 56 is capable of providing user video 70 having a virtual curtain 72.

The control circuitry 56 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 74 is capable of delivering all or portions of the software to the user computer 22. The computer program product 74 has a non-transitory (or non-volatile) computer readable medium which stores a set of instructions which controls one or more operations of the user computer 22. Examples of suitable computer readable storage media include tangible articles of manufacture and apparatus which store instructions in a non-volatile manner such as CD-ROM, flash memory, disk memory, tape memory, and the like.

During an online meeting, the user computer 22 (i.e., the control circuitry 56 running in accordance with the online meeting agent 62) provides a set of participant signals 40 to the conference server 24 through the communications medium 32 (also see FIG. 1). Likewise, the user computer 22 receives a set of server signals 42 from the conference server 24 through the communications medium 32.

It should be understood that the set of participant signals 40 includes a user video signal 80 (e.g., a feed from a webcam, a presenter's desktop or slideshow, etc.), a user audio signal 82 (e.g., an audio feed from a participant headset, an audio feed from a participant's phone, etc.), and additional user signals 84 (e.g., connection and setup commands and information, a participant profile, client device information, status and support data, etc.). It should be understood that one or more of these user signals 80, 82, 84 may be bundled together into a single transmission en route from the user computer 22 to the conference server 24 through the communications medium 26 (e.g., a stream of packets, etc.).

As also mentioned earlier, the set of conference signals 42 includes a server video signal 90 (e.g., combined feeds from multiple webcams, a presenter's desktop or slideshow, etc.), a server audio signal 92 (e.g., an aggregate audio signal which includes audio signals from one or more of the participants mixed together, etc.), and additional server signals 94 (e.g., connection and setup commands and information, conference information, status and support data, etc.). Again, one or more of these server signals 90, 92, 94 may be bundled together into a single transmission from the conference server 24 to the user computer 22 through the communications medium 26.

As the user computer 22 provides the user video signal 80 to the conference server 24, the control circuitry 56 may operate to include a virtual curtain 72 in the user video 70. Along these lines, the control circuitry 56 receives user video 70 captured by a camera, and replaces some of the content with the virtual curtain 72. Further details of this process will now be provided with reference to FIGS. 3 through 5.

Figure 3:
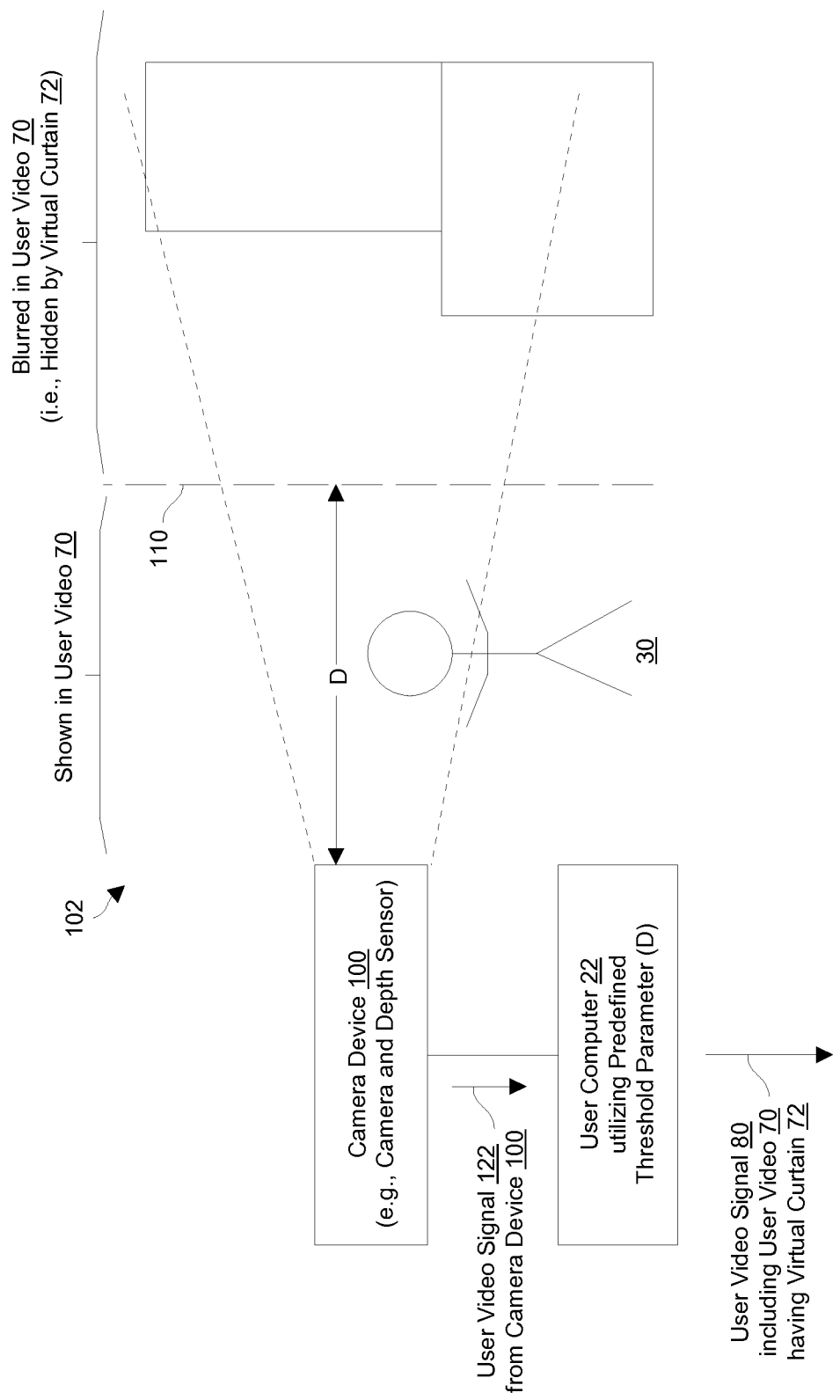
FIG. 3 is a diagram showing a user environment in which the user 30 captures user video for an online meeting.
Figure 4:
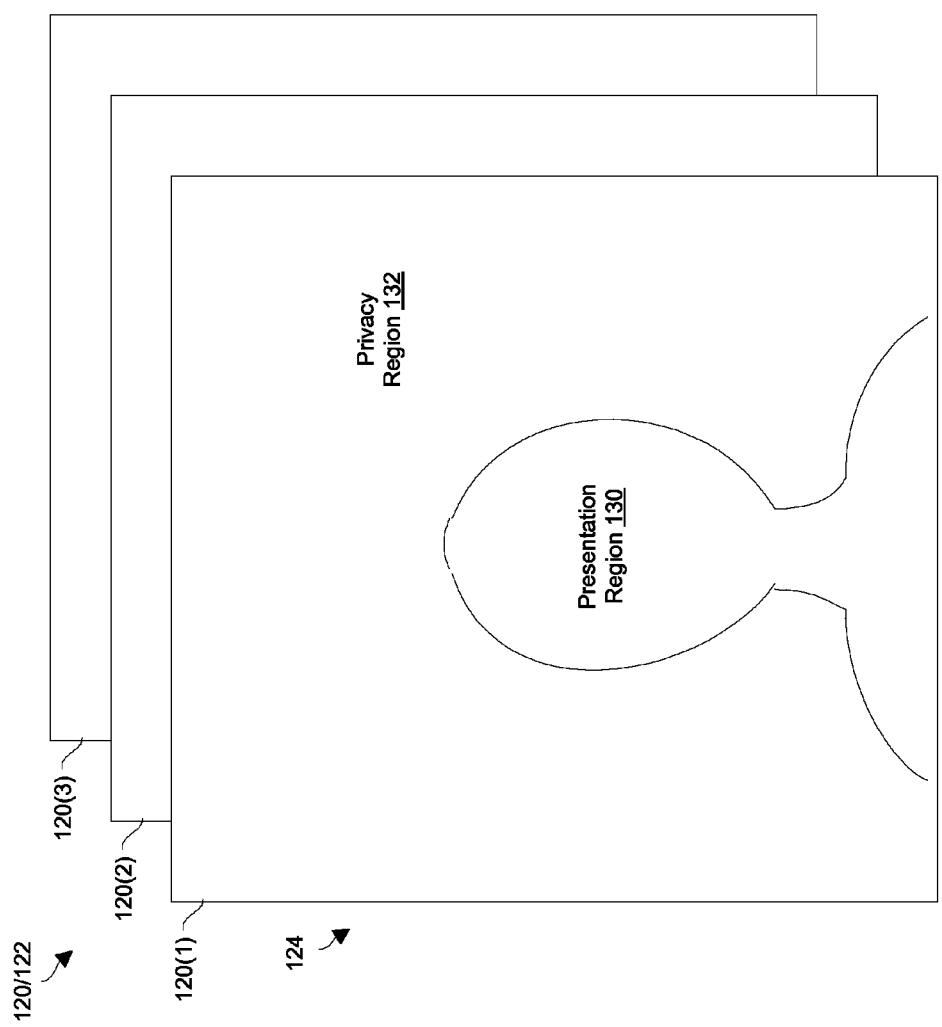
FIG. 4 is a diagram showing a series of video frames which forms an original user video signal obtained by the user computer of FIG. 2.
Figure 5:
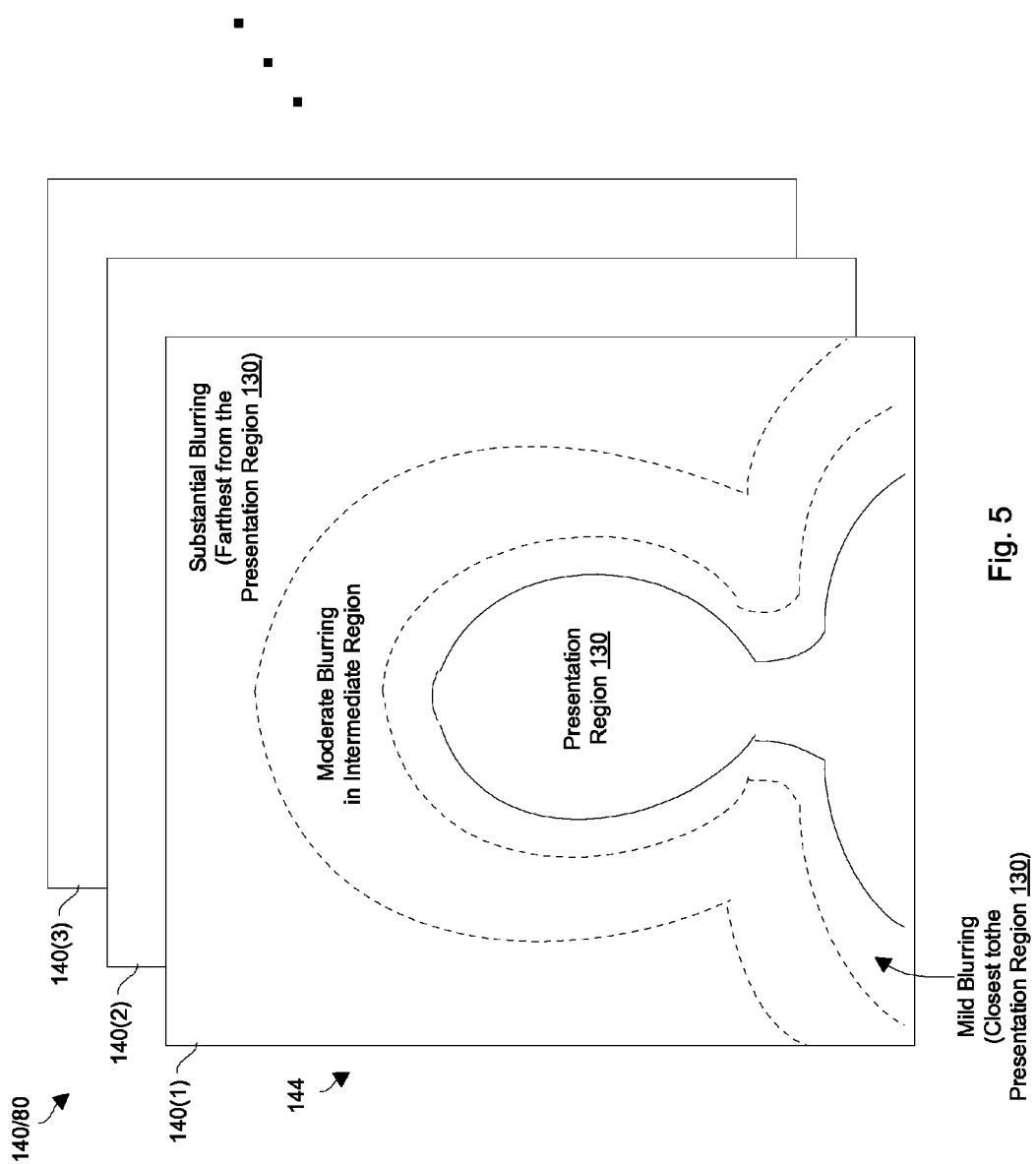
FIG. 5 is a diagram showing a series of video frames which forms a modified user video signal provided by the user computer of FIG. 2.

FIGS. 3 through 5 show particular details of how the virtual curtain 72 is added to user video 70 captured by a camera device 100. FIG. 3 shows a side view of a physical environment 102 of a user 30. FIG. 4 shows a series of original video frames 120(1), 120(2), 120(3), . . . (collectively, original video frames 120) which forms a live camera video signal 122 from the camera device 100. FIG. 5 shows a series of modified video frames 140(1), 140(2), 140(3), . . . (collectively, modified video frames 140) which forms the user video signal 80 provided by the user computer 22 to the conference server 24 (also see FIGS. 1 and 2).

As shown in FIG. 3, the user 30 participates in an online meeting by operating a user computer 22 (also see the control circuitry 56 and the online meeting agent 62 in FIG. 2). By way of example, the camera device 100 attaches as a peripheral to the user computer 22. However, in other arrangements, the camera device 100 is built in or forms part of the user computer 22 itself (e.g., in the context of a laptop computer, a tablet, a smart phone, etc.).

In some arrangements, the camera device 100 includes (i) a camera to capture the user video 70 and (ii) a depth sensor to provide depth measurement data indicating the depth of content within the user video 70 (e.g., infrared laser measurements obtained by an infrared laser sensor). Kinect by Microsoft Corporation of Redmond, Wash. is an example of a suitable camera device which performs depth sensing using infrared laser technology. In other arrangements, the camera device is a stereo camera, and depth measurement is made via a depth estimation process. Other depth measurement techniques are suitable for use as well (e.g., depth measurement via hardware which is separate from the camera device 100 and which is performed in parallel with operation of the camera device 100, etc.).

As further shown in FIG. 3, the user computer 22 utilizes a predefined depth threshold parameter (D) (also see the memory constructs 64 in FIG. 2). The predefined depth threshold parameter (D) imposes a depth threshold 110 (see vertical dashed line in FIG. 3), as measured from the depth sensor of the camera device 110 in the direction of where the camera device 100 is aimed. This depth threshold 110 determines whether to show content or replace content of the user video 70. In particular, content which is closer than the depth threshold 110 is shown in the user video signal 80 which is ultimately sent from the user computer 22 to the conference server 24 while content which is farther than the depth threshold 110 is replaced (e.g., blurred) in the user video signal 80 which is ultimately sent from the user computer 22 to the conference server 24.

It should be understood that the depth threshold 110 may be any value and is limited only by the scanning range of the hardware providing the depth measurement data. For a typical online meeting in which the user 30 mainly wishes to capture the user's face and upper body, distances such as three feet, four feet, five feet, one meter, two meters, etc. are suitable for use. Other distances are suitable as well (e.g., 8-10 feet, 10-12 feet, and so on). In these situations, background objects beyond the depth threshold 110 (e.g., table tops, shelves, walls, people, etc.) are hidden by the virtual curtain 72.

FIG. 4 shows a series of original video frames 120 which forms the user video signal 122 provided by the camera device 100. Each original video frame 120 includes an array 124 of pixels P(x,y), where x and y are coordinates within the array 124. Each pixel P(x,y) includes a pixel value Pv (i.e., representing a color for that pixel P(x,y)) and depth value Dv (i.e., representing a physical distance from the depth sensor 100 for that pixel P(x,y)), also see the camera device 100 in FIG. 3). The collection of depth values Dv enables robust and reliable isolation of one or more presentation regions 130 of pixels P(x,y) from one or more privacy regions 132 of P(x,y) based on this depth measurement data.

Likewise, FIG. 5 shows a series of modified video frames 140 which forms the user video signal 80 provided by the user computer 22 to the conference server 24. Each modified video frame 140 includes an array 144 of pixels P'(x,y), where x and y are coordinates within the array 144. At this point, it should be understood that the pixels P(x,y) of the presentation regions 130 of the original video frames 120 (e.g., capture images of the user 30) are copied from the original video frames 120 to the modified video frames 140. However, the pixels P(x,y) of the privacy regions 130 of the original video frames 120 are not copied from the original video frames 120 to the modified video frames 140 but instead are replaced with new pixels C(x,y) (e.g., representing blurred background content).

One should appreciate that the collection of depth values Dv thus enables robust and reliable isolation of background content based on depth measurement data. That is, a decision as to whether to show each pixel P(x,y) or replace that pixel P(x,y) with a new pixel C(x,y) can be based simply by comparing the depth value Dv of that pixel P(x,y) to the predefined distance threshold D. If the depth value Dv of that pixel P(x,y) is less than the predefined distance threshold D, that pixel P(x,y) is included within the corresponding video frame 140 which forms the user video signal 80 (also see FIG. 5). Otherwise, if the depth value Dv of that pixel P(x,y) is greater than (or equal to) the predefined distance threshold D, that pixel P(x,y) is replaced (e.g., blurred).

The following pseudo code represents this process:

```
If ( Dv(x,y) < D )      /* Compare depth value to predefined
                           distance threshold */
    P'(x,y) = P(x,y);   /* Show pixel                        */
Else                    /*                                   */
    P'(x,y) = C(x,y) ;  /* Replace pixel                     */
```

Accordingly, the user video signal 80 which is sent from the user computer 22 to the conference server 34 for use in the online meeting includes content from the presentation regions 130 of the original video frames 120 but modified video content in place of the content of the privacy regions 132 of the original video frames 120. As a result, the collection of replacement pixels C(x,y) within the modified video frames 140 appears as the virtual curtain 72 to other users participating the online meeting.

It should be understood that the manner of pixel replacement may be based on a variety of factors such as in a manner which is pleasing to online meeting participants. In some arrangements, pixel blurring increases as the distance from the presentation regions 130 increases. For example, as shown in FIG. 5, each video frame 140 includes a presentation region 130 (i.e., a copy of the content from the presentation region 130 of the user video signal 104 from the camera device 100). Additionally, each video frame 140 includes a privacy region 142 which included blurred content based on a blurring algorithm. The blurring algorithm blurs the initial (or original) content in the privacy region 132 by averaging adjacent pixel values. There is a greater blurring effect as the field of averaging widens.

In accordance with a particular arrangement and as shown in FIG. 5, the degree of blurring in the immediate vicinity of the presentation region 130 is mild. However, the degree of blurring in an intermediate region after the immediate vicinity of the presentation region 130 is moderate. Furthermore, the degree of blurring farthest away from the presentation region 130 is substantial.

In accordance with another arrangement, the degree of blurring is based on a Gaussian function. That is, for each video frame, the control circuitry 56 of the user computer 22 applies a Gaussian function to blur the background (e.g., a convolving process). Such operation is capable of providing a pleasing image as well as effectively reducing image noise.

In accordance with yet another arrangement, the degree of blurring is based on the distance of the user (i.e., the foreground content) from the camera device 100. For example, the control circuitry 56 of the user computer 22 can increase the degree of blurring for pixels as the distance values of those pixels increases. Accordingly, the pixels representing content farthest away are blurred the most, and the pixels representing content closest to the camera device 100 are blurred the least. Such an arrangement is capable of providing a pleasing image for user viewing. Other blurring techniques are suitable for use as well.

It should be understood that, during operation, the user 30 is able to selectively disable and enable blurring via blur control commands. For example, if the user 30 is comfortable in displaying the background of the physical environment 100 (see FIG. 3), the user 30 may enter a first control command to turn off the virtual curtain 72 (i.e., disable blurring). However, the user 30 may subsequently enter another control command to turn on the virtual curtain 72 (i.e., re-enable blurring), e.g., perhaps there is an event in the background which has become distracting to the online meeting.

Additionally, the user is able to vary the degree of blurring via blur variation commands. That is, the user 30 is able to enter different blur variation commands to increase and/or decrease the amount of blurring during subsequent operation. Accordingly, the user 30 has robust and reliable control to enhance the online meeting experience.

It should be further understood that the above-described generation of the user video signal 80 containing user video 70 having the virtual curtain 72 is capable even in situations which involve mixtures of full video frames and change frames (i.e., deltas). Moreover, such processing may take place in locations other than the user computer 22 (e.g., within a camera system, at the conference server, within a specialized video processor, etc.).

Additionally, it should be understood that situations may arise in which the control circuitry 56 receives noisy data in which there are no depth values Dv for particular pixels. For this situation, the control circuitry 56 can be preconfigured to process this imperfect data. For example, in some arrangements, the control circuitry 56 blurs all pixels which do not have depth values Dv in order to err on the side of privacy. In other arrangements, the control circuitry 56 preserves all pixels which do not have depth values Dv in order to preserve image content rather than replace the deficient pixels with the virtual curtain. In some arrangements, pixels having erroneous depth values Dv (e.g., negative depth values, out of bound depth values, etc.) are considered as also lacking depth values Dv and are thus handled in the manner described above.

Furthermore, it should be understood that imperfect data may be handled by preprocessing. Along these lines, the initial pixel data may include small areas having missing or erroneous depth values Dv (i.e., little holes in the data). In this situation, the control circuitry 56 may identify this imperfect pixel data (e.g., via scanning) and repair the imperfect pixel data by providing replacement depth values. These depth values may be determined via estimation or interpolation based on the actual depth values of neighboring healthy pixel data. Other repair techniques are suitable for use as well. Accordingly, the imperfect data is mended so that it is further processed in a normal manner.

Figure 6:
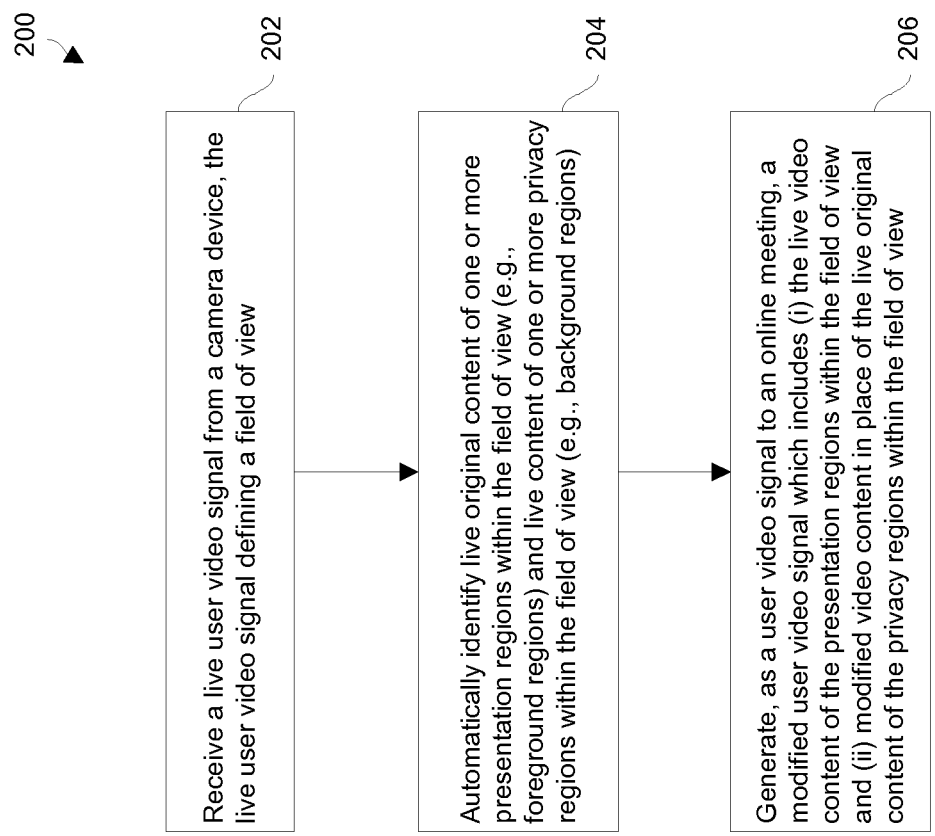
FIG. 6 is a flowchart of a procedure which is performed by the electronic environment of FIG. 1.

FIG. 6 is a flowchart of a procedure 200 which is performed by a user computer to provide a user video signal to an online meeting. In step 202, the user computer receives a live user video signal from a camera device, the live user video signal defining a field of view (e.g., raw or unmodified video content captured by the camera device).

In step 204, the user computer automatically identifies live initial content of one or more presentation regions within the field of view (e.g., foreground regions) and live initial content of one or more privacy regions within the field of view (e.g., background regions, also see FIG. 4). The presentation and privacy regions may be distinguished from each other based on depth measure data, e.g., a comparison of pixel depth values to a predefined threshold parameter.

In step 206, the user computer generates, as the user video signal to the online meeting, a modified user video signal based on the live user video signal. The modified video signal includes (i) the live initial content of the presentation regions within the field of view and (ii) modified video content in place of the live initial content of the privacy regions within the field of view.

As described above, improved techniques are directed to providing user video 70 having a virtual curtain 72 to an online conference. With such techniques, live initial content of a background region within a field of view (see FIG. 4) can be replaced with modified video content (e.g., blurred content) to hide anything in the background region (see FIG. 5). For example, depth sensing technology is capable of identifying background regions which can then be blurred (or otherwise replaced) and thus removed from view. Accordingly, participants are able to engage in online conferences in any locations without having to be concerned with what is shared in the background.

While various embodiments of the present disclosure have been particularly shown and described, it will be understood by those skilled in the art that various changes in form and details may be made therein without departing from the spirit and scope of the present disclosure as defined by the appended claims.

For example, it should be appreciated that, as video conferencing applications becoming accessible to a large population allowing people see each other in practically any location, users are facing new social and privacy concerns. If the location is not chosen carefully, the user might share undesired content in the background. For example, the user 30 may wish to avoid capturing a person in the background walking in the frame or simply a busy background. The virtual curtain 72 solves this concern by only showing objects close to the camera device 100. Anything in the background is hidden behind the virtual curtain 72. The regions 132 hidden by the virtual curtain 72 can be identified with the help of depth sensing video technology. This means that no complicated set up is required. Rather, the virtual curtain 72 allows the user 30 to engage in video conferences in any location without having to be concerned about the information shared in the background.

Additionally, it was described above that C(x, y) refer to pixel values of the virtual curtain 72. The distance of the virtual curtain 72 from the camera device 100 is D. This distance D can be static or dynamically calculated by using techniques like face detection to estimate the user's distance from the camera device 100.

Furthermore, it should be understood that traditional background replacement strategies may include use of Chroma key techniques sometimes referred to as green screen. However, green screens require a physical background setup. The virtual curtain utilizes depth information eliminating the need for a special background suitable for Chroma keying.

Additionally, a similar effect can be achieved by choosing a location with a neutral background or physically replacing the background. Also, there are alternatives to using the distance from the camera device 100 for the virtual curtain 72. For example, it is possible to use face and body recognition techniques to detect and track the participants in front of the camera device 100. In these arrangements, the virtual curtain 72 can be setup to hide objects in the background or people not facing the camera of the camera device 100.

Furthermore, in accordance with certain arrangements, the control circuitry 56 of the user computer 22 was described above as imposing a predefined distance threshold (i.e., a predefined depth threshold parameter (D)) to differentiate the background from the foreground. In other arrangements, the control circuitry 56 dynamically differentiates between the foreground and the background to dynamically establish a depth threshold parameter (D). Pixels are then separated into the presentation region and the privacy region based on comparisons between the associated depth values of the pixels and the dynamically established depth threshold parameter (D). Such arrangements alleviate the need for a predefined distance threshold and provide enhanced flexibility and user convenience.

For example, in some arrangements, the control circuitry 56 of the user computer 22 and the depth sensing feature of the camera device 100 form a skeletal tracking mechanism which monitors a field of view. Prior to user detection, the control circuitry 56 provides a virtual curtain over the entire field of view. When the skeletal tracking mechanism detects that a user has entered the field of view, the skeletal tracking mechanism identifies the user as foreground content and all objects further away as background content. The control circuitry 56 then displays the foreground content (i.e., an image of the user) and continues to replace the background content with the virtual curtain.

Along these lines and in certain arrangements, the mechanism dynamically computes a distance threshold (D) based on the measured distance of the user from the camera device 100, e.g., all objects that are more than X distance behind the user are considered background. In one arrangement, the value of X is static (e.g., 3 feet, 4 feet, 5 feet, 1 meter, etc.). In another arrangement, the value of X varies in accordance to the distance of the user from the camera device 100, e.g., X is greater the further away the user is from the camera device 100, X is shorter the closer the user is to the camera device 100, and so on. Other techniques for dynamically establishing the distance threshold (D) are suitable for use as well. Such modifications and enhancements are intended to belong to various embodiments of the disclosure.

What is claimed is:

1. A method of providing a user video signal to an online conference, the method comprising:
    receiving a live user video signal from a camera device, the live user video signal defining a field of view;
    automatically identifying live initial content of a presentation region within the field of view and live initial content of a privacy region within the field of view; and
    generating, as the user video signal to the online conference, a modified user video signal based on the live user video signal, the modified video signal including (i) the live initial content of the presentation region within the field of view and (ii) modified video content in place of the live initial content of the privacy region within the field of view;
    wherein the camera device includes a camera and a depth sensor;
    wherein receiving the live user video signal from the camera device includes acquiring, as the live user video signal, a series of video frames including captured images of a user from the camera and depth measurement data from the depth sensor; and
    wherein automatically identifying the live initial content of the presentation region and the live initial content of the privacy region includes:
        isolating the live initial content of the privacy region from the live initial content of the presentation region based on the depth measurement data.

2. A method as in claim 1 wherein each video frame includes an array of pixels, each pixel having an original pixel value and a depth value, the depth values of the pixels forming at least some of the depth measurement data; and
    wherein isolating the live initial content of the privacy region from the live initial content of the presentation region based on the depth measurement data includes, for each pixel, (i) maintaining the original pixel value when the depth value of that pixel is below a predefined depth threshold and (ii) replacing the original pixel value with a different pixel value when the depth value of that pixel exceeds the predefined depth threshold.

3. A method as in claim 2 wherein replacing the original pixel value with the different pixel value when the depth value of that pixel exceeds the predefined depth threshold includes:
    modifying the original pixel value based on a blurring algorithm to blur the live initial content of the privacy region.

4. A method as in claim 3 wherein modifying the original pixel value based on the blurring algorithm includes:
    varying a blur effect of the blurring algorithm to (i) mildly blur the live initial content of the privacy region which is closest to the presentation region, and (ii) substantially blur the live initial content of the privacy region which is farthest from the presentation region.

5. A method as in claim 4, further comprising:
    after generating the modified user video signal based on the live user video signal, receiving blur control commands which selectively disable and enable use of the blurring algorithm during subsequent operation.

6. A method as in claim 4, further comprising:
    after generating the modified user video signal based on the live user video signal, receiving blur variation commands which incrementally vary an amount of blurring performed via the blurring algorithm during subsequent operation.

7. A method as in claim 1 wherein the depth sensor is an infrared laser sensor; and wherein the depth measurement data includes infrared laser measurements of distances between the infrared laser sensor and an environment of the user.

8. A method as in claim 1 wherein the camera is a stereo camera; and wherein the depth measurement data includes depth estimate values of distances between the stereo camera and an environment of the user.

9. A method as in claim 1 wherein the camera is a webcam coupled to a user computer; and wherein the method further comprises:
    rendering, by a display of the user computer, an online conference video of the online conference to enable a user of the user computer to view the online conference.

10. A method as in claim 9 wherein generating the modified video signal includes:
    outputting, by the user computer, the modified video signal to an external online conference server through a computer network, the external online conference server being constructed and arranged to manage the online conference.

11. A method as in claim 1 wherein each video frame includes an array of pixels, each pixel having an associated depth value;
    wherein isolating the live initial content of the privacy region includes:
        (i) dynamically establishing a depth threshold based on distance of a foreground object in the field of view from the camera device, the depth threshold being greater than the distance of the foreground object in the field of view from the camera device, and
        (ii) isolating the live initial content of the privacy region from the live initial content of the presentation region based on comparison of the associated depth value of each pixel to the dynamically established depth threshold.

12. A method as in claim 1 wherein each video frame includes an array of pixels, each pixel being constructed and arranged to have an associated depth value; and
    wherein isolating the live initial content of the privacy region includes:
    processing pixels lacking associated depth values as live initial content of the presentation region for inclusion in the modified video signal to prevent loss of content.

13. A method as in claim 1 wherein each video frame includes an array of pixels, each pixel being constructed and arranged to have an associated depth value; and
    wherein isolating the live initial content of the privacy region includes:
    processing pixels lacking associated depth values as live initial content of the privacy region for replacement with a virtual curtain in the modified video signal to protect privacy.

14. A method as in claim 1 wherein each video frame includes an array of pixels, each pixel being constructed and arranged to have an associated depth value; and wherein the method further comprises:
    prior to generating the modified video signal, performing a preprocessing operation which associates new depth values to particular pixels initially lacking associated depth values to repair the particular pixels.

15. A method as in claim 1 wherein acquiring the series of video frames includes:
obtaining, for a particular video frame, an array of pixels that forms a particular captured image, each pixel of the array having (i) a pixel value that identifies a color for an object in the particular captured image and (ii) a depth value that defines a measured physical distance between the depth sensor and the object in the particular captured image.

16. An electronic apparatus, comprising:
a camera device;
memory; and
control circuitry coupled to the camera device and the memory, the memory storing instructions which, when carried out by the control circuitry, cause the control circuitry to:
receive a live user video signal from the camera device, the live user video signal defining a field of view,
automatically identify live initial content of a presentation region within the field of view and live initial content of a privacy region within the field of view, and
generate, as a user video signal to an online conference, a modified user video signal based on the live user video signal, the modified video signal including (i) the live initial content of the presentation region within the field of view and (ii) modified video content in place of the live initial content of the privacy region within the field of view;
wherein the camera device includes a camera and a depth sensor; and wherein the control circuitry, when receiving the live user video signal from the camera device, is constructed and arranged to:
acquire, as the live user video signal, a series of video frames including captured images of a user from the camera and depth measurement data from the depth sensor; and
wherein the control circuitry, when automatically identifying the live initial content of the presentation region and the live initial content of the privacy region, is constructed and arranged to:
isolate the live initial content of the privacy region from the live initial content of the presentation region based on the depth measurement data.

17. An electronic apparatus as in claim 16 wherein the camera is a webcam; wherein the electronic apparatus further comprises a display; and wherein the control circuitry is further constructed and arranged to:
render an online conference video of the online conference on the display to enable the user to view the online conference.

18. An electronic apparatus as in claim 16 wherein, the control circuitry, when acquiring the series of video frames, is constructed and arranged to:
obtain, for a particular video frame, an array of pixels that forms a particular captured image, each pixel of the array having (i) a pixel value that identifies a color for an object in the particular captured image and (ii) a depth value that identifies a measured physical distance between the depth sensor and the object in the particular captured image.

19. An electronic apparatus as in claim 16 wherein each video frame includes an array of pixels, each pixel having an original pixel value and a depth value, the depth values of the pixels forming at least some of the depth measurement data; and
wherein the control circuitry, when isolating the live initial content of the privacy region from the live initial content of the presentation region based on the depth measurement data is constructed and arranged to:
for each pixel, (i) maintain the original pixel value when the depth value of that pixel is below a predefined depth threshold and (ii) replace the original pixel value with a different pixel value when the depth value of that pixel exceeds the predefined depth threshold.

20. A computer program product having a non-transitory computer readable medium which stores a set of instructions to provide a user video signal to an online conference; the set of instructions, when carried out by computerized circuitry, causing the computerized circuitry to perform a method of:
receiving a live user video signal from a camera device, the live user video signal defining a field of view;
automatically identifying live initial content of a presentation region within the field of view and live initial content of a privacy region within the field of view; and
generating, as the user video signal to the online conference, a modified user video signal based on the live user video signal, the modified video signal including (i) the live initial content of the presentation region within the field of view and (ii) modified video content in place of the live initial content of the privacy region within the field of view;
wherein the camera device includes a camera and a depth sensor; and
wherein receiving the live user video signal from the camera device includes acquiring, as the live user video signal, a series of video frames including captured images of a user from the camera and depth measurement data from the depth sensor; and
wherein automatically identifying the live initial content of the presentation region and the live initial content of the privacy region includes isolating the live initial content of the privacy region from the live initial content of the presentation region based on the depth measurement data.

21. A computer program product as in claim 20 wherein the camera is a webcam coupled to a user computer which contains the computerized circuitry; and wherein the method further comprises:
rendering, via a display of the user computer, an online conference video of the online conference to enable a user of the user computer to view the online conference.

22. A computer program product as in claim 20 wherein acquiring the series of video frames includes:
obtaining, for a particular video frame, an array of pixels that forms a particular captured image, each pixel of the array having (i) a pixel value that identifies a color for an object in the particular captured image and (ii) a depth value that is indicative of a measured physical distance between the depth sensor and the object in the particular captured image.

23. A computer program product as in claim 20 wherein each video frame includes an array of pixels, each pixel having an original pixel value and a depth value, the depth values of the pixels forming at least some of the depth measurement data; and
wherein isolating the live initial content of the privacy region from the live initial content of the presentation region based on the depth measurement data includes, for each pixel, (i) maintaining the original pixel value when the depth value of that pixel is below a predefined depth threshold and (ii) replacing the original pixel value with a different pixel value when the depth value of that pixel exceeds the predefined depth threshold.

* * * * *